United States Patent
Sullivan et al.

(10) Patent No.: US 7,706,995 B2
(45) Date of Patent: Apr. 27, 2010

(54) CAPACITANCE MANOMETERS AND METHODS RELATING TO AUTO-DRIFT CORRECTION

(76) Inventors: Philip Sullivan, 77 Robbins Rd., Lexington, MA (US) 02421; David Alcaide, 7 Chatfield Dr., Nashua, NH (US) 03063

( * ) Notice: Subject to any disclaimer, the term of this patent is extended or adjusted under 35 U.S.C. 154(b) by 3 days.

(21) Appl. No.: 11/735,654

(22) Filed: Apr. 16, 2007

(65) Prior Publication Data
US 2008/0255787 A1 Oct. 16, 2008

(51) Int. Cl.
G01D 18/00 (2006.01)
(52) U.S. Cl. .............................. 702/85; 702/87; 702/88; 702/90
(58) Field of Classification Search ................ 702/47, 702/50, 98, 100, 140, 183; 73/718, 724; 137/486; 715/749
See application file for complete search history.

(56) References Cited

U.S. PATENT DOCUMENTS

| | | | |
|---|---|---|---|
| 4,466,289 A * | 8/1984 | Lam ............................ | 73/724 |
| 6,216,726 B1 * | 4/2001 | Brown et al. ................. | 137/486 |
| 6,837,112 B2 * | 1/2005 | Ferran et al. .................. | 73/718 |
| 6,910,381 B2 * | 6/2005 | Albert et al. .................. | 73/718 |
| 7,195,594 B2 * | 3/2007 | Eigler et al. ................. | 600/485 |
| 2007/0150819 A1 * | 6/2007 | Goodman et al. ............ | 715/749 |
| 2007/0233412 A1 * | 10/2007 | Gotoh et al. ................. | 702/100 |

FOREIGN PATENT DOCUMENTS

| | | |
|---|---|---|
| JP | 06307962 | 11/1994 |
| WO | 9845675 | 10/1998 |
| WO | 0116571 | 3/2001 |

OTHER PUBLICATIONS

International Search Report for corresponding PCT Application No. PCT/US2008/059986, 4pp.
Written Opinion for corresponding PCT Application No. PCT/US2008/059986, 9pp.

* cited by examiner

*Primary Examiner*—Carol S Tsai
*Assistant Examiner*—Felix E Suarez
(74) *Attorney, Agent, or Firm*—McDermott Will & Emery LLP

(57) ABSTRACT

Systems, methods, and apparatus, including software implementation, are disclosed providing drift prediction of output values for manometers. A signal or other indication may be provided for or in relation to a capacitance manometer when a servicing, replacing, and/or zeroing event is predicted or determined to be required, based on a history (e.g., timestamps) associated with previous zeroing events. Previously recorded timestamps can be curve fit with suitable functions to calculate or predict future maintenance, calibration, and/or replacement events for a manometer. Such signals or indications can be generated as an on-screen indication, and could also be available upon interrogation of the manometer via a digital communications link or system.

61 Claims, 5 Drawing Sheets

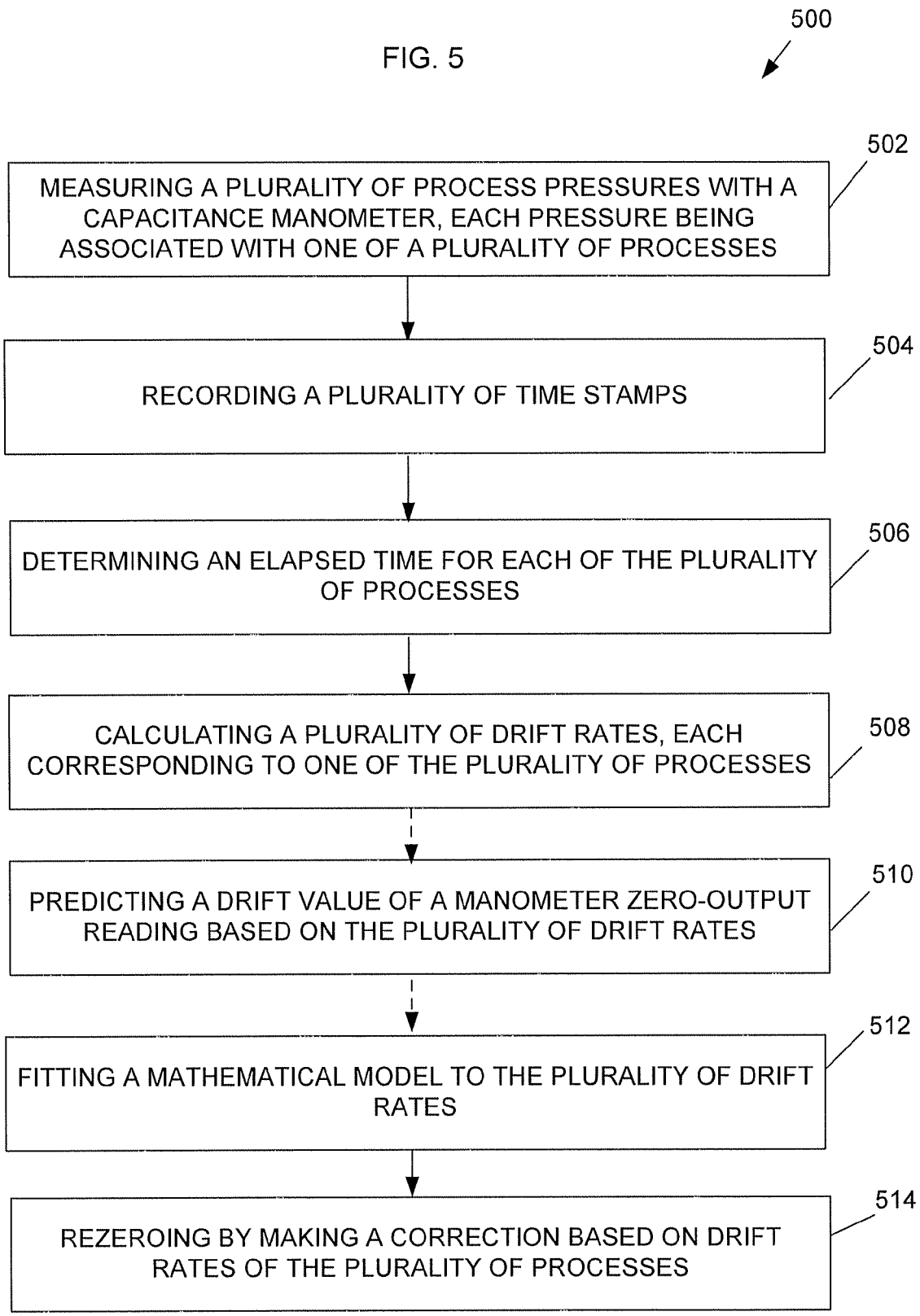

CAPACITANCE MANOMETERS AND METHODS RELATING TO AUTO-DRIFT CORRECTION

FIELD

The present disclosure relates to pressure transducers, and more particularly to capacitance type manometers provided with auto-drift correction.

BACKGROUND

Pressure transducers have been employed in a myriad of applications. One such transducer is the capacitance manometer which provides very precise and accurate measurements of pressure of a gas, vapor or other fluid. Applications include precise pressure measurement and high-precision gas and vapor delivery systems, which have become very important in many industrial applications, for example in the semiconductor industry for wafer and chip fabrication, although other applications are known. Such fluid delivery systems typically also include, but are not limited to, devices such as mass flow controllers (MFCs) and mass flow verifiers (MFVs) to regulate and/or monitor the flow of gases and vapors.

Capacitance manometers typically use a flexible diaphragm forming or including an electrode structure and a fixed electrode structure spaced from the diaphragm so as to establish a capacitance there between. Variation in pressure on one side of the diaphragm relative to the pressure on the opposite side of the diaphragm causes the diaphragm to flex so that the capacitance between the electrode structure of the diaphragm and the fixed electrode structure varies as a function of this differential pressure. Usually, the gas or vapor on one side of the diaphragm is at the pressure being measured, while the gas or vapor on the opposite side of the diaphragm is at a known reference value, whether at atmosphere, or some fixed high or low (vacuum) pressure, so that the pressure on the measuring side of the diaphragm can be determined as a function of the capacitance measurement.

When a capacitance manometer is used to measure pressure and the diaphragm flexes to provide a capacitance change, it is expected that when the pressure on the measuring side of the diaphragm returns to the same pressure as the reference side (the "zero state"), the instrument will indicate a "zero" reading. However, over time, for various reasons, the reading will drift from zero when the manometer returns to a zero state. Accordingly, the manometer reading must be zeroed and calibrated from time to time to return the reading to zero for the zero state. For prior art capacitance manometers, determination of whether the manometer needs to be zeroed (e.g., have its zero-reading calibrated) has typically been decided on a time related basis, e.g., every six months, or on a routine basis, e.g., every preventative maintenance cycle (PM), or never. The choice of how often to zero the manometer is typically left to the discretion of an operator or user (e.g., a semiconductor process engineer). Such a decision has typically been based on a human inspection of previous drifts.

Any recording of accumulated drift for prior art capacitance manometers, has typically been accomplished by measuring such drift manually during routine zeroing. A judgment by the user then would then need to be made about the zeroing frequency, or whether the manometer has reached the end of its useful life.

In practice, users have typically not made such judgments due to various reasons including lack of time and/or complexity of factors involved. Instead, users have typically decided to zero or replace a manometer in reaction to an alarm on the related process tool or system or when they notice the manometer can no longer be zeroed (out of adjustment). In either case, the replacement or zeroing of the manometer causes an unexpected equipment failure problem (down time of the tool or system). Such unscheduled maintenance or replacements are something that must be dealt with outside of routine maintenance schedules, which is costly in terms of efficient use of the overall tool or system.

Thus, users have had to make a priori judgments about the frequency of zeroing. Determination of whether a manometer needs routine maintenance such as recalibration has generally not been done. Any recording of the manometer cumulative zero changes are typically also performed manually, an inconvenient process. In fact, the user generally only knows when a problem exists when there is a tool or system alarm.

What is desirable, therefore, are systems, methods, and apparatus that address the limitations noted for the prior art by predicting and/or indicating when a capacitance manometer, such as those used for high-precision fluid delivery systems, requires zeroing, maintenance, and/or replacement, and automatically calibrating the system to correct for drift when possible.

SUMMARY

Embodiments of the present disclosure are directed to systems, methods, and apparatus, including software implementation, useful for pressure transducers (e.g. capacitance manometers) to provide a signal or otherwise indicate when a zeroing event, servicing, or replacement should be performed. Such prediction can be based on a history (e.g., recorded timestamps) associated with previous zeroing events of the particular manometer. Signals/indications for the zeroing, maintenance, or replacement can be generated as an alarm or on-screen indication, and may also be available upon interrogation of the manometer via a communications link or system, such as an Ethernet connection.

In one embodiment, a capacitance manometer may be provided that is configured and arranged to predict a drift value of the manometer zero-output reading based on the intrinsic drift or a process-related drift of the manometer zero-reading. Such a capacitance manometer can include a sensor housing or capsule with a first port and a second port, and a diaphragm disposed within the sensor capsule. The diaphragm, e.g., a flexible metal disk, has two sides and can be configured and arranged to move within the sensor capsule in response to a pressure difference between respective pressures on the two sides of the diaphragm. An electrode structure can be located within the sensor capsule adjacent to one side of the diaphragm; and an electronic circuit may be present that is configured and arranged to measure capacitance between the diaphragm and the electrode structure and to produce a zero-output reading corresponding to a measured zero pressure. The electronic circuit can be further configured and arranged to (i) record two or more time stamps corresponding to a zero-output-reading adjustment of the manometer, and (ii) predict a drift value of the manometer zero-output reading based on the two or more zero-offset values. The manometer can be configured and arranged to produce an alarm, a digital output and/or an analog output. The manometer can be configured and arranged to predict a manometer zero-reading exceeding a specified drift amount based on the two or more time stamps by extrapolation of recorded drift data.

In a further embodiment, a method of predicting a drift value of a zero-reading of a capacitance manometer based on the manometer intrinsic drift is provided. Such a method can include zeroing a capacitance manometer two or more times and recording a time-stamped zero-offset value for each time the manometer is zeroed. The two or more zero-offset values can be recorded. A drift value of the manometer zero-output reading can be predicted based on the two or more zero-offset values. Predicting a drift value can include determining a requirement for zeroing the manometer based on the two or more zero-offset values. Predicting a drift value can include determining that the zero-output reading will exceed a specified threshold and/or determining a requirement for replacing or servicing the manometer.

In a further embodiment, a method of predicting a drift value of a zero-reading of a capacitance manometer based on one or more process-related drift values is provided. Such a method can include measuring a plurality of process pressures with a capacitance manometer. Each process pressure can be associated with one of a plurality of processes; determining an elapsed time for each of the plurality of processes; calculating a plurality of drift rates, each corresponding to one of the plurality of processes; and predicting a drift value of a manometer zero-output reading based on the plurality of drift rates. Determining an elapsed time for each of the plurality of processes can include recording a plurality of time stamps. Recording a plurality of time stamps can include recording a pair or more of time stamps for each process. Each pair of time stamps can include a process-start time stamp and a process-end time stamp. Predicting a drift value of a manometer zero-output reading can include fitting a mathematical function to the plurality of drift rates. While certain embodiments are described herein, one skilled in the art will appreciate that other embodiments and aspects are inherent in and supported by the included description and drawings of the present disclosure.

BRIEF DESCRIPTION OF THE DRAWINGS

Aspects of the disclosure may be more fully understood from the following description when read together with the accompanying drawings, which are to be regarded as illustrative in nature, and not as limiting. The drawings are not necessarily to scale, emphasis instead being placed on the principles of the disclosure. In the drawings:

FIG. 5 is a flow chart showing the steps of one preferred embodiment of a method of predicting process-related zero drift of a capacitance manometer based on time stamps associated with one or more identified processes measured by the capacitance manometer, in accordance with a further embodiment of the present disclosure.

Figure 1:
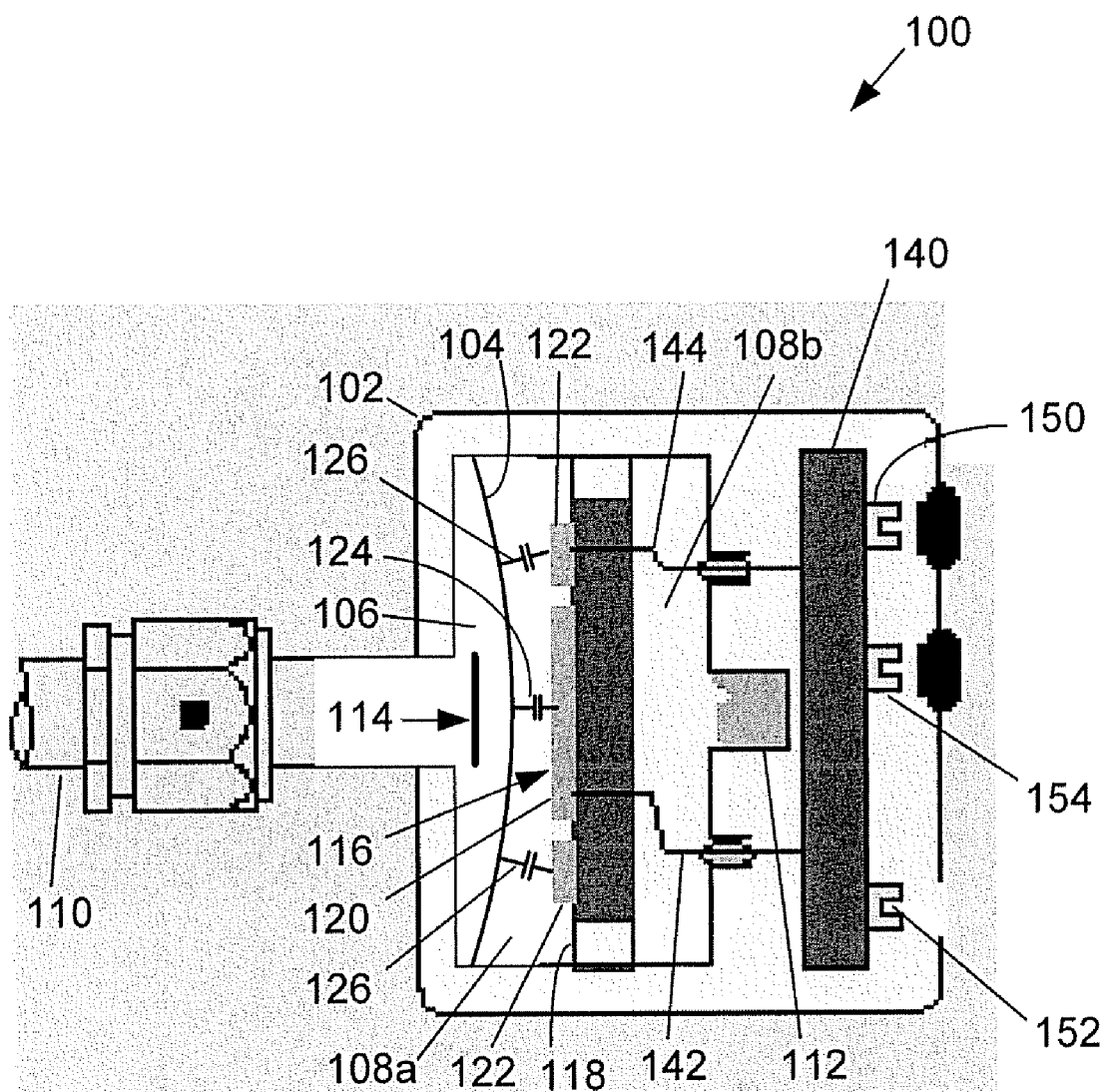
FIG. 1 is a simplified, cross-sectional view of an embodiment of a capacitance manometer configured and arranged in accordance with certain aspects of the present invention.

It should be understood by one skilled in the art that the embodiments depicted in the drawings are illustrative and variations of those shown as well as other embodiments described herein may be envisioned and practiced within the scope of the disclosure.

DETAILED DESCRIPTION

Aspects of the present disclosure are directed to systems, methods, and apparatus useful for determining or predicting the need for zeroing (e.g., zero-reading calibration), maintenance, or replacement of a capacitance manometer. Exemplary embodiments can include software or firmware having computer-executable code, e.g., suitable algorithm(s), according to the present disclosure.

FIG. 1 depicts one type of capacitance manometer 100 that can be adapted to include auto-drift correction. Manometer 100 includes a housing 102 and a flexible diaphragm 104 disposed within the housing. The diaphragm divides the housing so as to provide a measurement chamber 106 and the reference chamber 108 (with two parts 108a-b shown in FIG. 1) so that the two chambers can hold fluids at different pressures. Diaphragm 104 includes a flexile film, disk or plate, which flexes when subjected to a differential pressure, i.e. different pressures are exerted on the opposite sides of the diaphragm so that differential forces exerted by the differential pressures flex the diaphragm. The housing 102 also includes an inlet measurement port 110 that is configured and arranged to allow a fluid to be introduced into the measurement chamber 106. Inlet reference port 112 is configured and arranged to allow a fluid or vacuum to be introduced into the reference chamber 108, and thus on the opposite side of the diaphragm 104 relative to chamber 106. Usually the fluid/vacuum introduced in the reference chamber is at a known pressure, e.g., one atmosphere, or a high or low (vacuum) pressure. The two sides of the diaphragm 104 are sealed from one another so that any differential pressure can be accurately measured. As shown, baffle 114 may be present within housing 102 on the measurement side to redirect flow of the fluid to be measured, and/or to protect against foreign objects.

Figure 2:
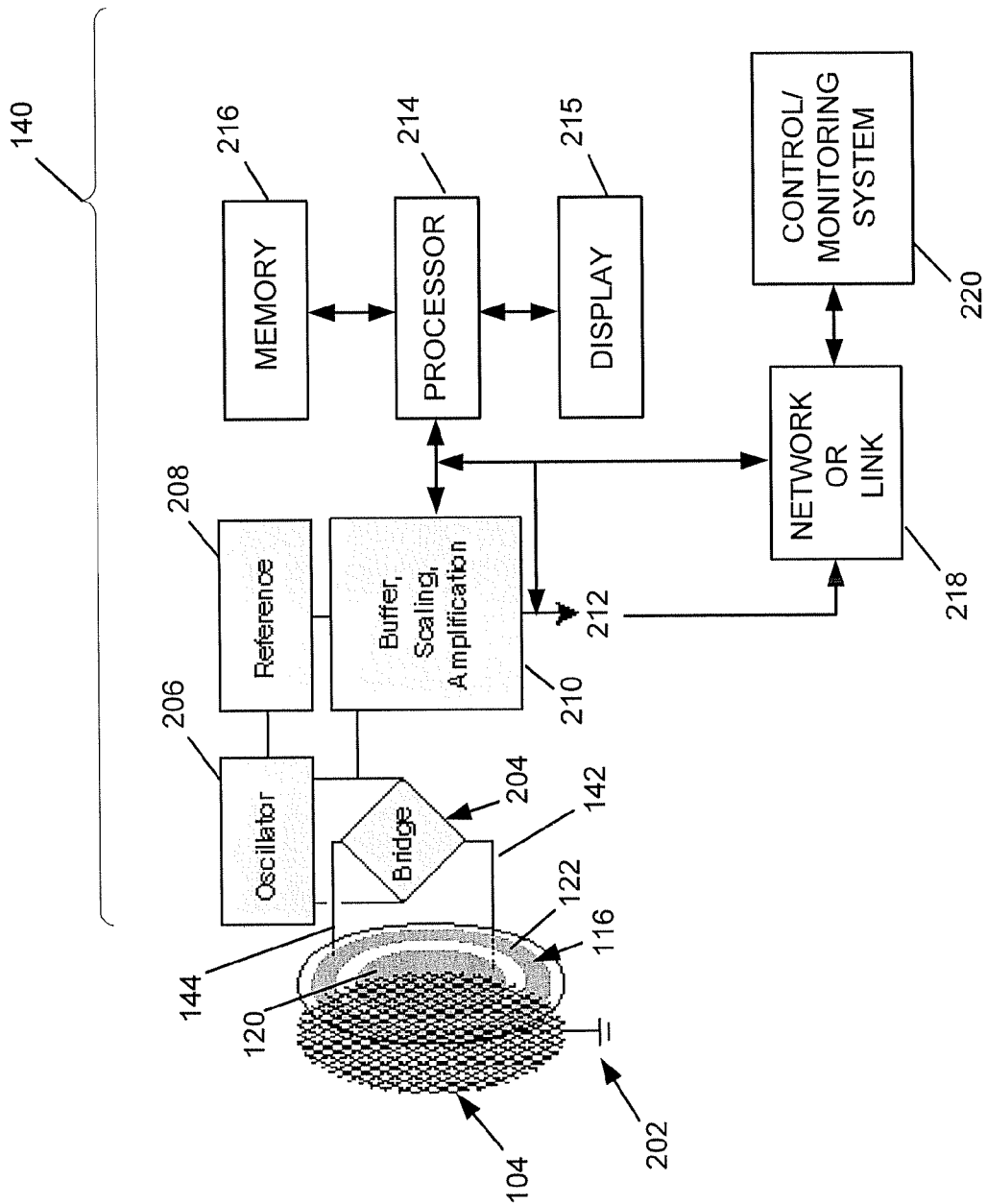
FIG. 2 is a simplified partial schematic and partial block diagram of the electrical components of a typical capacitance manometer designed in accordance with certain aspects of the present invention.

With reference to FIGS. 1 and 2, at least one electrode structure 116 is provided within housing 102. Electrode structure 116 remains in a fixed position, regardless of the pressure in the measurement and reference chambers 106 and 108. While various electrode structures are known, in the illustrated embodiment the electrode structure 116 includes a support 118 of insulation material for supporting a central electrode 120 and a ring electrode 122, the latter preferably being concentric with the central electrode 120. The diaphragm 104 is typically constructed so as to define or include structure forming one side of a capacitor arrangement, while the other sides of the capacitor arrangement are is formed by the electrode structure. The electrode structure 116 can be fixedly supported at a pre-selected distance relative to the diaphragm 104 so that capacitance measurements between the electrode structure and the diaphragm provide a measurement of the pressure within the measurement chamber relative to the pressure in the reference chamber. More precisely, in the embodiment shown in FIGS. 1 and 2, the difference in capacitance between the central electrode 120 and diaphragm 104 (indicated by capacitor symbol 124) and between the ring electrode 122 and the diaphragm 104 (indicated by the capacitor 126) provides a very accurate measurement of the pressure difference between the measurement chamber 106 and the reference chamber, e.g., 108b. Flexure of the diaphragm 104 within the housing 102 in response to a differential pressure thus alters the capacitances between the diaphragm 104 and each of the electrodes 120 and 122.

Manometer 100 also includes electronics board/circuit 140 connected to lines 142 and 144, as well as to system ground. Lines 142 and 144 are electrically connected to the central and ring electrodes 120 and 122, respectively. Electronics board/circuit 140 is preferably constructed and arranged so as to include a measurement circuit for providing a measurement signal output, as well as other output signals to be described hereinafter.

Referring to FIG. 2, an example of an electronics board/circuit 140 is shown. The diaphragm 104 is connected to system ground as shown at 202. The illustrated measurement system includes a bridge circuit 204, drive circuit 206, a reference signal generator 208 and a signal conditioning circuit 210. The voltage between the central electrode 118 and ground, and the voltage between the ring electrode and ground are applied respectively to the opposite sides of bridge circuit 204 through lines 142 and 144 and system ground. In the illustrated embodiment, the drive circuit 206 includes a sine-wave oscillator configured and arranged to drive bridge circuit 204. Signal conditioning circuitry 210 (for example, including a buffer, signal scaling and signal amplification components) may be used to condition the output from the bridge circuit 204, as well as provide other data signals. The illustrated measurement circuit 200 also includes reference signal generator 208 constructed and arranged so as to store a reference value and provide a reference output signal to the signal conditioning circuit 210. An imbalance in the sensor electrode capacitance (between the capacitance of the central electrode and the diaphragm on the one hand, and the capacitance of the ring electrode and the diaphragm on the other hand, produces a difference output of the measurement circuit 204 that is conditioned and amplified by signal conditioning circuitry 210. The latter produces an output signal 212 corresponding to the amount the diaphragm flexes, which in turn is a measure of the differential pressure applied to the diaphragm.

In addition, when the pressure in the measurement chamber 106 and the reference chamber 108 are equal, the output 212 of electronics block/circuit 140 should be a zero-output reading corresponding to a measured zero differential pressure. Electronics block/circuit 140 is further configured and arranged to include processor 214 and memory 216. Providing processor 214 and memory 216 allows for the provision of record time stamps (e.g., unique time identifiers) associated with zeroing events of manometer 100. Manometer 100 can also include a power supply (not shown) that is configured and arranged to supply power to electronic circuit 140. A display (e.g., a graphical user interface [GUI], LED or LCD readout, etc.) 215 can also be configured and arranged to display information associated with the operation of the manometer including the time stamp information. In addition, the output 212 can be transmitted to a control or monitoring system 220 through a network or communication link 218.

The electronics block/circuit 140 preferably includes a stored reference value (as provided by reference signal generator (referenced as 208 in FIG. 2) for a desired zero-reading value (equal, for example, to the reference pressure in the reference chamber). The electronics block/circuit 140 also preferably includes a span potentiometer, represented by adjustment screw 150, for adjusting the calibration curve span of the manometer; and a linearity potentiometer, represented by adjustment screw 152, that is configured and arranged to adjust the linearity of a calibration curve of the manometer. In addition, the electronics block/circuit 140 preferably includes one or more zero potentiometers, represented by adjustment screw 154, configured and arranged to adjust the zero-reading output value of the manometer to a desired value. In exemplary embodiments, these adjustment functions can be performed and stored digitally.

Manometer 100 also is provided, preferably as a part of electronics block/circuit 140, one or more components for reading and collecting a log of time-stamped zero-offset values, which in turn can be collected every time the manometer 100 is zeroed. The zero-offsets can correspond to the amount the zero-pressure reading (indicated by the manometer) has moved or drifted since the last zeroing event or initial construction. Processor 214 and software code and/or firmware can be used to achieve this. Such code can be stored or loaded into, for example, suitable memory such as electrically-erasable programmable read-only-memory (EEPROM) or "flash" memory associated with and or forming a part of electronics block/circuit 140. The software or firmware can use the consecutive data to make a prediction about when the next zeroing and/or replacement event should take place by fitting the offset-data to a mathematical model/function, e.g., linearly extrapolating or curve-fitting. Such components including the software or firmware code may also be run or stored in a location remote from the manometer 100, for use with the manometer 100 through a suitable communications link, e.g., an Ethernet connection, etc.

By recording two or more time stamps corresponding to zero-output-reading adjustments of the manometer, the electronics block/circuit 140 can operate to predict a drift value of the manometer zero-output reading based on the recorded zero-offset values, e.g., by fitting a curve/function to the recorded offset data. In exemplary embodiments, the electronics block/circuit 140 can operate as a digital control unit configured and arranged to receive computer readable instructions from a communication link to a control system outside the manometer.

In exemplary embodiments, just one reading, not a pair, can be used. An event such as a zero shift may happen prior to or during turn-on, which indicates the manometer should immediately be removed from service, without waiting for the next reading. Alternatively, if the manometer is at a pressure (such as zero) for a long time, more than two time-stamps could be taken/performed during such a period.

Figure 3:
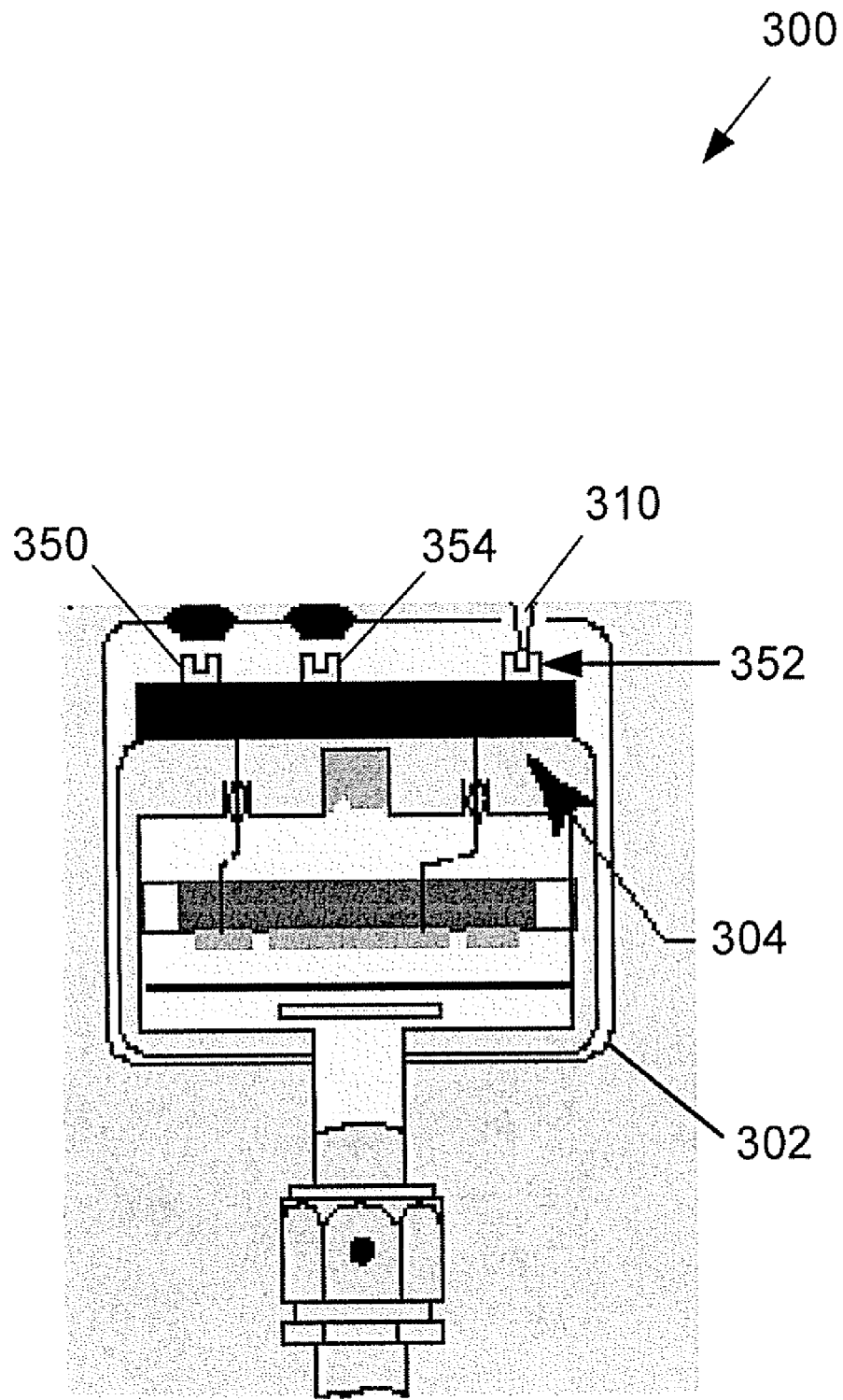
FIG. 3 is a simplified, cross-sectional view of another embodiment of a capacitance manometer configured and arranged in accordance with certain aspects of present invention.

Referring to FIG. 3, an exemplary embodiment of a temperature-controlled capacitance manometer 300 is further depicted in accordance with the present disclosure. Manometer 300 is similar to that shown for FIG. 1, with the same reference characters being applicable, and also includes a constant temperature oven or heating element 304 configured and arranged to regulate and/or control temperature within housing 302. A portion of the manometer 300 is shown removed so as to expose the adjustment screws 150, 152 and 154. An adjustment tool 310 (e.g., a screwdriver) can be used for turning the adjustment screws as needed. These adjustments can also be accomplished/performed by associated digital electronics (not shown).

As noted previously, it can be useful to routinely zero (calibrate the zero-reading) capacitance manometers to ensure they are working correctly, i.e., the calibration curve may be unchanged during a period of operation but the reading value corresponding to zero output (zero pressure) may be wrong because the zero (and thus the whole curve) may have shifted. Typically manometers, particularly those designed for low pressure ranges, exhibit intrinsic zero drift/shift, e.g., in a negative direction with a profile (drift rate) that varies from unit to unit. Without limiting the disclosure, such a drift rate typically may be in the range between 0 and $-1E-4$ mT per day. Additionally in some semiconductor processes, notably etch and deposition processes, the possibility exists that process materials can become deposited on the sensor diaphragm and lead to zero-shift or zero-drift in addition to the intrinsic drift of the sensor. Typical high values for some etch processes are in the range of 0.1 mT-1 mT per day, though this is a representative (and not limiting) range.

Preferably, the user generally uses the same routine zeroing methodology for both intrinsic zero drift and process related zero drift: the device is pumped down to a pressure below the resolution limit of the manometer and the device output, e.g., voltage, is adjusted to reflect zero pressure, e.g., adjusted to 0V. In the more aggressive process-related drift situations, the zeroing usually needs to be done more often. Manometers designed in accordance with the present disclosure can be used to predict drift values of either type of drift, intrinsic or process-related in accordance with various methods, the preferred methods being described hereinafter with reference to FIGS. 4 and 5.

Figure 4:
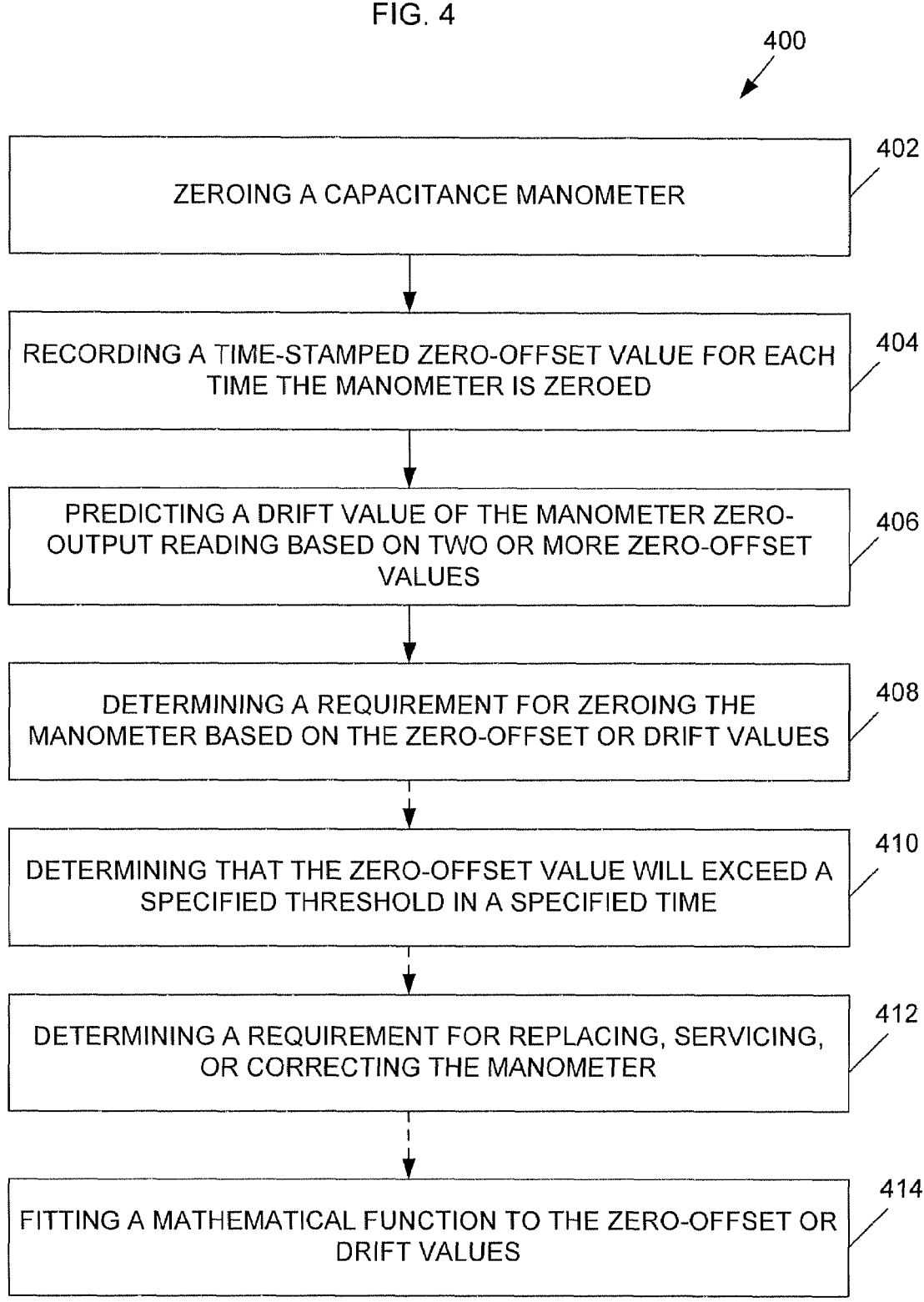
FIG. 4 is a flow chart showing the steps of one preferred embodiment of a method of predicting intrinsic zero drift of a capacitance manometer based on two or more time stamps associated with time of operation of the manometer in accordance with an exemplary embodiment of the present disclosure.

FIG. 4 illustrates method 400 of predicting zero-reading drift, e.g., intrinsic drift, of a capacitance manometer, based on two or more time stamps associated with time of operation of the manometer. The method can include the step 402 of zeroing capacitance manometer two or more times and step 404 of recording a time-stamped zero-offset value for each time the manometer is zeroed so as to record two or more zero-offset values. A drift value of the manometer zero-output reading can be predicted at step 406 based on the two or more zero-offset values.

With continued reference to FIG. 4, predicting a drift value can include step 408 of determining or predicting a requirement for zeroing the manometer based on the two or more zero-offset values. Predicting a drift value can include step 410 of determining that the zero-output reading will exceed a specified threshold at a predicted time. The process then proceeds to step 412 of determining a requirement for replacing (or servicing) the manometer based on the predicted drift.

Step 414 provides for a function for zeroing the output of the manometer, and can include fitting a mathematical function to the two or more offset values and extrapolating a future zero drift based on the mathematical function. Fitting a mathematical function can include fitting a straight line function, a polynomial function, and/or an exponential function, or other suitable function. Statistical/regression analysis can be used for the function/curve fitting at step 414. The specified threshold can be a predetermined value. Further, the specified threshold can be a user programmed value, e.g., such as one provided by a user over an Ethernet connection or other suitable communications link.

Method 400 can further include zeroing, performing maintenance on/for (?), or replacing the manometer in response to predicting a drift value of the manometer zero-output reading. Zeroing can be done at zero pressure, or at any known pressure. Further, zeroing can also be done at any time and at any static or dynamic pressure using the drift rates calculated above. Method 400 can also include sending a drift value of the manometer zero-output reading at the output of the manometer to control system, such as control system 220 shown in FIG. 2, by a communications link. The control system is preferably configured and arranged to control operation of the manometer. Predicting a drift value of the manometer zero-output reading can include a manometer electronic controller executing computer-readable instructions. Method 400 can include using a graphical user interface to control operation of the manometer, as for example through display 216 of FIG. 2.

Instructions relating to zeroing the output of the manometer to eliminate the cumulative drift can vary. For example, assuming a cumulate drift is found over two or more consecutive measurements to equal a drift rate of D milli Torr (mT) per day and assuming an accuracy specification is A % of reading, a possible decision point could be to say that when the zero drift has reached a known threshold value then the manometer should be zeroed. Another possibility is to re-zero the manometer when the zero drift causes the output at R % of full scale to have shifted outside of the required accuracy specification and therefore the manometer should be re-zeroed.

In at least one exemplary embodiment, the step 408 of predicting or determining a requirement for zeroing can include determining a time to next zeroing event according to the following equation:

$$T = \frac{(R \times A \times F)}{(100 \times D)}; \qquad (Eq.\ 1)$$

wherein A is an accuracy specification (% of reading); F is a full scale pressure reading; D is a recorded drift (pressure unit/time); R is the ratio of the operating pressure to the manometer full scale pressure and T is the time until the next zeroing event. Although linear extrapolation is used as an example above in Eq. 1, as described previously, further exemplary embodiments can utilize a suitable curve fitting algorithm/technique in the case where the drift profile is non-linear with respect to time or pressure.

The calculated value T can be used to trigger the manometer software or electronics to send a signal to the manometer GUI and/or tool software, e.g. as a predictive date (e.g., "Tool/User must perform zero routine on or before date X").

Similarly a decision point could be derived related to routine maintenance. e.g. Total acceptable/allowable drift of manometer=20% of full scale. The above Equation 1 along with recorded drift data can be used to predict when the unit will have run out of zero adjustability and thus should be returned to service depot for routine maintenance.

EXAMPLE 1

Intrinsic Drift

For certain applications, a manometer can be characterized as having an intrinsic drift for its zero-reading corresponding to the time of operation of the manometer. Such an "intrinsic" zero-drift can be accommodated and predicted by embodiments according to the present disclosure.

For example, using an MKS 628 100 mT manometer (sold by the present assignee) with accuracy of within 0.5% of reading and with an intrinsic drift rate of 7E-4 mT per day, the allowed drift between zero events at 10 mT according to Eq. 1 would be 0.5% of 10% of 100 mT=5E-2 mT. The number of days predicted would therefore be the value of 5E-2/7E-4, or approximately 71 days.

In addition or as an alternative to identifying intrinsic drift of a manometer and using the observed intrinsic drift to predict future drift from zero, e.g., as provided by the method illustrated by FIG. 4, it may be useful to distinguish drift that occurs during different periods (e.g., process versus non-process time) of operation of the manometer with a view to separately calculating process related drift as opposed to intrinsic drift. In many cases, the process can be identified by an algorithm in the transducer itself after downloading pressure vs process data, just by knowledge of the pressure measured. Alternatively the process identification can be externally supplied.

In certain embodiments or applications, there may be one intrinsic drift rate when the power is applied (e.g. because the transducer is hot), and another when power is off (e.g. when the transducer is on the shelf). For useful application of intrinsic drift rates, total time may need to be used whether powered up or not. One solution to this, would be to have the transducer interrogate the system time whenever it powers up, get its internal timekeeping in sync with true time, and separate total elapsed time from powered elapsed time. When powered, this would allow better calculation of both types of intrinsic drift data whether power has been down or not. Embodiments can utilized a real time clock for this purpose, e.g., in the manometer itself and powered by an appropriate suitable battery.

FIG. 5 illustrates an example of steps of a method, indicated generally at 500, of predicting process-related zero drift of a capacitance manometer based on time stamps associated with one or more identified processes of a plurality of processes measured by the manometer. By determining the elapsed time that the manometer spends measuring fluid/gas pressure of one or more processes that have been identified as contributing all, most, or a significant part of the conditions leading to zero-drift, prediction of zero-drift can be made with a high degree of accuracy. Method 500 can be used to predict a requirement or need for a zeroing event, routine maintenance event, and/or manometer replacement from a knowledge of how long the manometer is exposed to process versus non-process conditions, e.g., conditions that are relatively deleterious to the zero-calibration of the manometer versus conditions that are relatively benign. Method 500 can include determining a requirement for zeroing, servicing, and/or replacing the manometer based on the plurality of measured drift rates. Predicting a drift value can include determining that the zero-output reading will exceed a specified threshold, which can be predetermined and/or user programmed.

Method 500 can include step 502 of measuring a plurality of process pressures with a capacitance manometer, each process pressure being associated with one of a plurality of processes or process steps. A plurality of time stamps can be recorded at step 504. An elapsed time for each of the plurality of processes can be measured or determined at step 506, e.g., based on the recorded time stamps. A plurality of drift rates can be calculated at step 508 with each corresponding to one of the plurality of processes. A drift value of the manometer zero-output reading can be predicted at step 510 based on the plurality of drift rates. At step 512 a mathematical model or function can be fit to the data associated with the plurality of drift rates.

As described above, recording step 504 includes generating and recording a plurality of time stamps which can then be utilized at step 506 for determining an elapsed time for each of the plurality of processes. Recording a plurality of time stamps can include recording a pair of time stamps for each process. Each pair of time stamps can include a process-start time stamp and a process-end time stamp. Predicting a drift value of a manometer zero-output reading can include fitting 512 a mathematical function to the plurality of drift rates. Fitting a mathematical function 512 can include fitting a straight line function, a polynomial function, and/or an exponential function, or any other suitable function. Statistical/regression analysis can be utilized at step 512.

Exemplary embodiments of method 500 can include predicting a drift value of the manometer zero-output reading. The method can further include calculating a time integral of one or more of the plurality drift rates to produce one or more drift values. The predicted drift rates can also be used in 514 to correct the transducer zero.

A drift value of the manometer zero-output reading calculated according to method 500 may be sent to a control system, such as control system 220 of FIG. 2 by a suitable network or communications link, e.g., link 218. Such a control system may be configured and arranged to control operation of the manometer. Predicting a drift value of the manometer zero-output reading by way of method 500 can also include operation of a manometer electronic controller executing computer-readable instructions. In exemplary embodiments, a graphical user interface, such as through display 216 of FIG. 2, can be used to control operation of the manometer.

For methods such as method 500, the elapsed time for process exposure versus the elapsed time for non-process exposure are preferably determined. For example, a user/operator would identify in advance one or more windows of process pressure measurement and the manometer would record date stamped information related to the different modes of operation, e.g., say a 1-Torr full-scale (FS) manometer could be used for process measurement at 50 mT (process 1 with drift RP1) and also at 300 mT (process 2 with drift RP2). Outside of those bands the manometer might not experience any significant drift (e.g., process 3 with drift RPO). The user would identify those pressure bands of interest by communicating with the manometer (e.g., via a personal computer and on-screen GUI, such as through display 216).

Continuing with the example, the manometer could then record, via date stamped information, how long the manometer was being used within those pressure bands identified as being critical (process exposure for times T1, T2, ... etc.) and also outside of those pressure bands (non-process exposure for time TO). The total drift D (mT) can be given by (TO× RPO)+(T1×RP1)×(T2×RP2)× etc. By compiling this information individual drift rate coefficients could be calculated for different processes and fed back to be used for drift predictive purposes, e.g., by curve-fitting and extrapolation.

For simplicity, a user could set up each process separately and measure individual zero drift coefficients. For such embodiments, it could be possible to predict drift and, therefore, zeroing periodicity without direct reference to the cumulative zero drift and only from a knowledge of the how long the manometer is used within certain process-specific bands.

The following example illustrate zeroing event prediction according to exemplary embodiments of the present disclosure:

EXAMPLE 2

Process Related Drift

For certain applications, a manometer can be characterized as having a zero-drift that corresponds to the time of operation of the manometer for one or more specific processes and not for others. Such a "process-related" zero-drift can be accommodated and predicted by embodiments according to the present disclosure.

For a MKS 628 100 mT manometer (sold by the present assignee) with accuracy 0.5% of reading with intrinsic drift rate of 0.1 mT per day, according to EQ. 1, the allowed drift at 10 mT between zero events would be 0.5% of 10% of 100 mT=5E-2 mT. The number of days predicted would therefore be 5E-2/0.1, or approximately 0.5 days.

In exemplary embodiments according to the present disclosure, an Ethernet-Enabled Baratron® Capacitance Manometer, e.g., a model 627C e-Baratron® (Baratron is a registered trademark of the present assignee) manometer as commercially available from the present assignee of the disclosure, may be used with modification/programming to track and process time stamp data associated with zeroing events. Ethernet-enabled e-Baratron® manometers may be particularly desirable in exemplary embodiments as they can provide the ability to network with Ethernet hubs and other devices for local or network diagnostics without disassembly or removal from a host system.

MKS Ethernet-equipped e-Baratron® manometers include embedded internet browser software that allow them to communicate with any Windows®-based PC. Since the Ethernet port operates in parallel to the standard analog communications, the device can be diagnosed on a real-time basis during processing—a huge benefit for users who perform their own system analysis and troubleshooting. Even for users who do not use Ethernet networking, e-Baratron® manometers also have external LEDs to give a fast intuitive guide to the device's status. Further exemplary embodiments may utilize an i-Baratron® digital capacitance manometer, as made commercially available by the assignee of the present disclosure. For such manometers, an interface can be provided through an Open DeviceNet's Vendor Association (ODVA) compliant DeviceNet™ communications protocol, or other suitable protocol.

Features and benefits provided by such e-Baratron® and/or i-Baratron® manometers include: high accuracy and repeatability; standard product lines include both analog and Ethernet communications for use in existing and latest generation of networked process tools; Ethernet communications are real-time and can be run in parallel with analog communications, allowing in-situ diagnostics of device and process and without any need for cable disconnection; embedded Internet web browser can communicate with any Windows-based PC; intuitive Graphical User Interface (GUI) with complete set of diagnostic routines that can be used for the device or the process; easy-to-understand external indicators for immediate device status information; full-scale pressure ranges from 1,000 Torr to 0.02 Torr; pin-to-pin compatible with other heated analog Baratron® capacitance manometers and some competitive products; CE compliant, and tested to applicable provisions of SEMI S2-93 safety guidelines.

Accordingly, embodiments of the present disclosure can provide use of a capacitance manometer that is configured and arranged to signal a user and/or semiconductor tool/system when the manometer should next be zeroed and needs to be maintained or replaced. Systems, methods, and/or apparatus (which may include software and/or firmware including computer-executable instructions) in accordance with present disclosure can be used to automate the decision making process with respect to zeroing methodology. The manometer indicates a date by which the user should perform a zeroing procedure. This disclosure allows the manometer to predict when it should be taken out of service thus preventing unscheduled downtime.

Embodiments according to the present disclosure can allow a capacitance manometer, e.g., as installed on a semiconductor process tool, to be zeroed automatically without operator intervention. The signal provided by the manometer would allow the tool software to schedule an automatic zeroing event without inconveniencing the user. This can facilitate a reduction in the number of unnecessary/false alarms on the tool or system that would otherwise be caused by the zero-reading of the manometer drifting beyond the allowed amount and/or threshold.

While certain embodiments have been described herein, it will be understood by one skilled in the art that the methods, systems, and apparatus of the present disclosure may be embodied in other specific forms without departing from the spirit thereof.

For example, while use of capacitance manometers has generally been described for gas delivery systems, one of skill in the art will understand that such manometers may be utilized in other suitable configurations/applications. For example, a capacitance manometer in accordance with the present disclosure may be part of a rate-of-rise (ROR) flow verifier used to verify the accuracy of measurement systems/components such as mass flow controllers (MFCs) or mass flow verifiers (MFVs).

The embodiments described herein are therefore to be considered in all respects as illustrative and not restrictive of the present disclosure.

What is claimed is:

1. A capacitance manometer comprising:
a sensor capsule with a first port and a second port;
a diaphragm disposed within the sensor capsule, wherein the diaphragm has two sides and is configured and arranged to move within the sensor capsule in response to a pressure difference between respective pressures on the two sides of the diaphragm;
an electrode structure disposed within the sensor capsule adjacent to one side of the diaphragm; and
an electronic circuit configured and arranged to (i) measure capacitance between the diaphragm and the electrode structure, (ii) produce a zero-output reading corresponding to a measured zero pressure, (iii) record two or more time stamps, each corresponding to a respective zero-output reading, and (iv) predict a future drift value of the manometer zero-output reading based on the two or more time stamps and the respective zero-output readings.

2. The manometer of claim 1, wherein the manometer is configured and arranged to produce a digital output.

3. The manometer of claim 1, wherein the manometer is configured and arranged to produce an analog output.

4. The manometer of claim 1, wherein the manometer is configured and arranged to predict a manometer zero-reading exceeding a specified drift amount based on the two or more time stamps.

5. The manometer of claim 1, wherein the first port is a measurement port for fluidic coupling to a process tool and the second port is a reference port for coupling to a vacuum or other pressure source.

6. The manometer of claim 5, wherein the vacuum source includes a getter pump connected to the sensor capsule.

7. The manometer of claim 1, wherein the first port is connected to a semiconductor process tool.

8. The manometer of claim 5, wherein the electrode structure comprises an outer ring electrode and an inner electrode disposed within the ring electrode, wherein a first electrical connection is coupled to the ring electrode and a second electrical connection is coupled to the inner electrode.

9. The manometer of claim 8, wherein the electronic circuit is connected to the first and second electrical connections.

10. The manometer of claim 9, wherein the electronic circuit includes an electrical bridge circuit connected to the first and second electrical connections and an oscillator connected to the bridge and configured and arranged to drive the bridge circuit.

11. The manometer of claim 9, wherein the electronics block further includes a stored reference value for a desired zero-reading value and a buffer configured and arranged to receive the difference signal from the bridge circuit, wherein the buffer is configured and arranged to scale and amplify the difference output signal produced by the bridge circuit.

12. The manometer of claim 9, further comprising a digital control unit configured and arranged to produce an output signal indicating that the manometer requires zeroing or replacing at a predicted time.

13. The manometer of claim 9, further comprising a digital control unit configured and arranged to correct the pressure output signal for predicted zero drifts based on two or more zero-offset values.

14. The manometer of claim 12, further comprising a computer-readable medium including computer-executable instructions for (i) recording two or more time stamps corresponding to a zero-output-reading adjustment of the manometer, and (ii) predicting a drift value of the manometer zero-output reading based on the two or more zero-offset values.

15. The manometer of claim 12, wherein the digital control unit is configured and arranged to receive computer-readable instructions from a communication link to a control system outside the manometer.

16. The manometer of claim 15, wherein the control system is a graphical user interface.

17. The manometer of claim 11, wherein the electronics block includes a span potentiometer configured and arranged to adjust a calibration curve span of the manometer.

18. The manometer of claim 9, wherein the electronics block includes a linearity potentiometer configured and arranged to adjust the linearity of a calibration curve of the manometer.

19. The manometer of claim 9, wherein the electronic blocks includes one or more zero potentiometers configured and arranged to adjust a zero-reading output value of the manometer to a desired value.

20. The manometer of claim 5, wherein the sensor capsule comprises an austenitic nickel-based super alloy.

21. The manometer of claim 9, further comprising a power supply configured and arranged to supply power to the electronics block.

22. The manometer of claim 1, further comprising a display configured and arranged to display information associated with the operation of the manometer.

23. The manometer of claim 1, further comprising a temperature-regulated heat source within the vicinity of the sensor capsule for maintaining temperature within the sensor capsule at a desired temperature.

24. The manometer of claim 5, wherein in the diaphragm includes a metal.

25. The manometer of claim 21, wherein the metal comprises an austenitic nickel-based super alloy.

26. A method of predicting a future drift value of a zero-output reading of a capacitance manometer, the method comprising:
zeroing a capacitance manometer two or more times;
recording a time-stamped zero-offset value for each time the manometer is zeroed, wherein two or more zero-offset values are recorded; and
predicting a future drift value of the manometer zero-output reading based on the two or more zero-offset values and the intervening time between the two or more zero-offset values.

27. The method of claim 26, wherein predicting a drift value includes determining a requirement for zeroing the manometer based on the two or more zero-offset values.

28. The method of claim 26, wherein predicting a drift value includes determining that the zero-output reading will exceed a specified threshold.

29. The method of claim 28, further comprising determining a requirement for replacing the manometer.

30. The method of claim 26 wherein predicting a requirement for a zeroing includes fitting a mathematical function to the two or more offset values.

31. The method of claim 30, wherein fitting a mathematical function includes fitting a straight line function.

32. The method of claim 31, wherein fitting a mathematical function includes fitting a polynomial function.

33. The method of claim 30, wherein fitting a mathematical function includes fitting an exponential function.

34. The method of claim 28, wherein the specified threshold is a predetermined value.

35. The method of claim 28, wherein the specified threshold is a user programmed value.

36. The method of claim 26, wherein predicting a requirement for zeroing includes determining a time to next zeroing event according to $$T = \frac{(R \times A \times F)}{(100 \times D)};$$

wherein A is an accuracy specification (% of reading); F is a full scale pressure reading; D is a recorded drift (pressure unit/time); R is the ratio of the operating pressure to the manometer full scale pressure; and T is time to next zeroing event.

37. The method of claim 26, further comprising adjusting a zero-reading output value of the manometer to a desired value in response to predicting a drift value of the manometer zero-output reading.

38. The method of claim 26, further comprising replacing the manometer to a desired value in response to in response to predicting a drift value of the manometer zero-output reading.

39. The method of claim 26, further comprising sending a drift value of the manometer zero-output reading to a control system by a communications link, wherein the control system is configured and arranged to control operation of the manometer.

40. The method of claim 26, wherein predicting a drift value of the manometer zero-output reading includes a manometer electronic controller executing computer-readable instructions.

41. The method of claim 39, further comprising using a graphical user interface to control operation of the manometer.

42. A method of predicting a future drift value of a zero-output reading of a capacitance manometer, the method comprising:
measuring a plurality of process pressures with a capacitance manometer, each process pressure being associated with one of a plurality of processes of a semiconductor device fabrication process;
determining an elapsed time for each of the plurality of processes;
calculating a plurality of drift rates for a zero-output reading of the manometer, each corresponding to one of the plurality of processes; and
predicting a future drift value of a manometer zero-output reading based on the plurality of drift rates.

43. The method of claim 42, wherein determining an elapsed time for each of the plurality of processes comprises recording a plurality of time stamps.

44. The method of claim 43, wherein recording a plurality of time stamps includes recording a pair of time stamps for each process.

45. The method of claim 44, wherein each pair of time stamps includes a process-start time stamp and a process-end time stamp.

46. The method of claim 42, wherein predicting a drift value of a manometer zero-output reading includes fitting a mathematical function to the plurality of drift rates.

47. The method of claim 42, wherein predicting a drift value of the manometer zero-output reading includes calculating a time integral of one or more of the plurality drift rates to produce one or more drift values.

48. The method of claim 42, further comprising determining a requirement for zeroing the manometer based on the plurality of drift rates.

49. The method of claim 42, wherein predicting a drift value includes determining that the zero-output reading will exceed a specified threshold at a predicted time.

50. The method of claim 42, further comprising determining a requirement for replacing the manometer.

51. The method of claim 42, wherein predicting a requirement for a zeroing includes fitting a mathematical function to the one or more drift values.

52. The method of claim 51, wherein fitting a mathematical function includes fitting a straight line function.

53. The method of claim 51, wherein fitting a mathematical function includes fitting a polynomial function.

54. The method of claim 51, wherein fitting a mathematical function includes fitting an exponential function.

55. The method of claim 49, wherein the specified threshold is a predetermined value.

56. The method of claim 49, wherein the specified threshold is a user programmed value.

57. The method of claim 42, further comprising adjusting a zero-reading output value of the manometer to a desired value in response to predicting a drift value of the manometer zero-output reading.

58. The method of claim 42, further comprising replacing the manometer to a desired value in response to predicting a drift value of the manometer zero-output reading.

59. The method of claim 42, further comprising sending a drift value of the manometer zero-output reading to a control system by a communications link, wherein the control system is configured and arranged to control operation of the manometer.

60. The method of claim 42, wherein predicting a drift value of the manometer zero-output reading includes a manometer electronic controller executing computer-readable instructions.

61. The method of claim 59, further comprising using a graphical user interface to control operation of the manometer.

* * * * *

UNITED STATES PATENT AND TRADEMARK OFFICE
CERTIFICATE OF CORRECTION

| | | |
|---|---|---|
| PATENT NO. | : 7,706,995 B2 | Page 1 of 1 |
| APPLICATION NO. | : 11/735654 | |
| DATED | : April 27, 2010 | |
| INVENTOR(S) | : Philip Sullivan et al. | |

It is certified that error appears in the above-identified patent and that said Letters Patent is hereby corrected as shown below:

Title Page, Item (73) Assignee, insert

-- (73) Assignee: MKS Instruments, Inc., Andover, MA (US) --

Signed and Sealed this
Second Day of August, 2011

David J. Kappos
*Director of the United States Patent and Trademark Office*